US011373648B2

(12) United States Patent
Sato

(10) Patent No.: US 11,373,648 B2
(45) Date of Patent: Jun. 28, 2022

(54) CONTROL DEVICE, CONTROL SYSTEM, AND NON-TRANSITORY COMPUTER READABLE MEDIUM

(71) Applicant: FUJIFILM BUSINESS INNOVATION CORP., Tokyo (JP)

(72) Inventor: Koichi Sato, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 208 days.

(21) Appl. No.: 16/569,847

(22) Filed: Sep. 13, 2019

(65) Prior Publication Data

US 2020/0098365 A1 Mar. 26, 2020

(30) Foreign Application Priority Data

Sep. 25, 2018 (JP) ............................ JP2018-178334

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
USPC ...................................................... 704/1–504
See application file for complete search history.

(56) References Cited

U.S. PATENT DOCUMENTS 8,484,146 B2 * 7/2013 Movellan ............... B25J 13/003 706/45
9,431,017 B2 * 8/2016 Kojima .................. G10L 15/22
9,747,903 B2 * 8/2017 Kojima .................. G10L 15/22
10,102,861 B2 10/2018 Kojima et al.
11,032,675 B2 * 6/2021 Ylönen .................. G06F 3/165
2012/0197420 A1 * 8/2012 Kumakura .............. G10L 25/51 700/94
2013/0124210 A1 * 5/2013 Ouchi .............. H04N 21/44008 704/275
2015/0287411 A1 * 10/2015 Kojima .................. G10L 15/22 704/246
2016/0329054 A1 * 11/2016 Kojima .................. G10L 15/22
2017/0091123 A1 * 3/2017 Sato ........................ G06F 21/44
2019/0019518 A1 1/2019 Kojima et al.
2019/0200175 A1 * 6/2019 Ylönen .................. H04B 1/401
2020/0098365 A1 * 3/2020 Sato ........................ G10L 15/22
2021/0035581 A1 * 2/2021 Hatanaka ................ G10L 15/22
2021/0118443 A1 * 4/2021 Yuki ....................... G06F 21/32

FOREIGN PATENT DOCUMENTS

JP 2002-91491 A 3/2002
JP 2015-201739 A 11/2015

* cited by examiner

*Primary Examiner* — Marcus T Riley
(74) *Attorney, Agent, or Firm* — Oliff PLC

(57) ABSTRACT

A control device includes a first receiving unit that receives an operation instruction given by voice or generated from voice; a second receiving unit that receives information concerning a sound volume of the voice input to a voice input unit provided corresponding to a target apparatus; a target apparatus specifying unit that specifies a target apparatus on a basis of the information concerning the sound volume received by the second receiving unit; and a transmitting unit that transmits an operation command based on the operation instruction received by the first receiving unit to the target apparatus specified by the target apparatus specifying unit.

14 Claims, 6 Drawing Sheets

10

CONTROL DEVICE, CONTROL SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-178334 filed Sep. 25, 2018.

BACKGROUND

(i) Technical Field

The present disclosure relates to a control device, a control system, and a non-transitory computer readable medium.

(ii) Related Art

Japanese Unexamined Patent Application Publication No. 2002-91491 discloses a voice control system including an apparatus to be controlled, a microphone that is disposed at plural positions in a space and detects user's voice, sound collecting unit that collects voice data detected by each microphone, a voice recognition unit that analyzes contents of voice data input to the sound collecting unit, a distribution analyzing unit that detects a direction of utterance of a user on the basis of a magnitude of the voice data input to the sound collecting unit, a speculating unit that decides an apparatus to be controlled and contents of an operation on the basis of the contents of the voice data analyzed by the voice recognition unit and the direction of utterance of the user analyzed by the distribution analyzing unit, and an apparatus controller that transmits a control signal to the apparatus to be controlled on the basis of the apparatus and the contents of the operation decided by the speculating unit.

Japanese Unexamined Patent Application Publication No. 2015-201739 discloses a voice operation system including plural apparatuses to be operated, a remote control associated with one of the plural apparatuses, and an integrated controller that operates the plural apparatuses by voice, wherein the remote control includes a sound collecting unit that receives user's voice and an operation information generating unit that generate remote control operation information concerning a user's remote control operation; the integrated controller includes a voice recognition unit that outputs an apparatus name and an operation name as a recognition result on the basis of the voice, an apparatus specifying unit that specifies an apparatus to be operated on the basis of the apparatus name and the remote control operation information, and an operation specifying unit that specifies contents of an operation on the specified apparatus from the operation name; and the apparatus specifying unit specifies an apparatus to be operated by using the remote control operation information in a case where the apparatus name is not extracted from the recognition result.

SUMMARY

In a case where there are plural target apparatuses to be controlled by user's voice, it is necessary to specify a target apparatus to be used by the user from among the plural apparatuses.

Aspects of non-limiting embodiments of the present disclosure relate to providing a control device, a control system, and a non-transitory computer readable medium that can specify and control a target apparatus even in a case where a user does not designate a target apparatus by voice.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a control device including a first receiving unit that receives an operation instruction given by voice or generated from voice; a second receiving unit that receives information concerning a sound volume of the voice input to a voice input unit provided corresponding to a target apparatus; a target apparatus specifying unit that specifies a target apparatus on a basis of the information concerning the sound volume received by the second receiving unit; and a transmitting unit that transmits an operation command based on the operation instruction received by the first receiving unit to the target apparatus specified by the target apparatus specifying unit.

BRIEF DESCRIPTION OF THE DRAWINGS

An exemplary embodiment of the present disclosure will be described in detail based on the following figures, wherein.

DETAILED DESCRIPTION

Next, an exemplary embodiment of the present disclosure is described in detail below with reference to the drawings.

Figure 1:
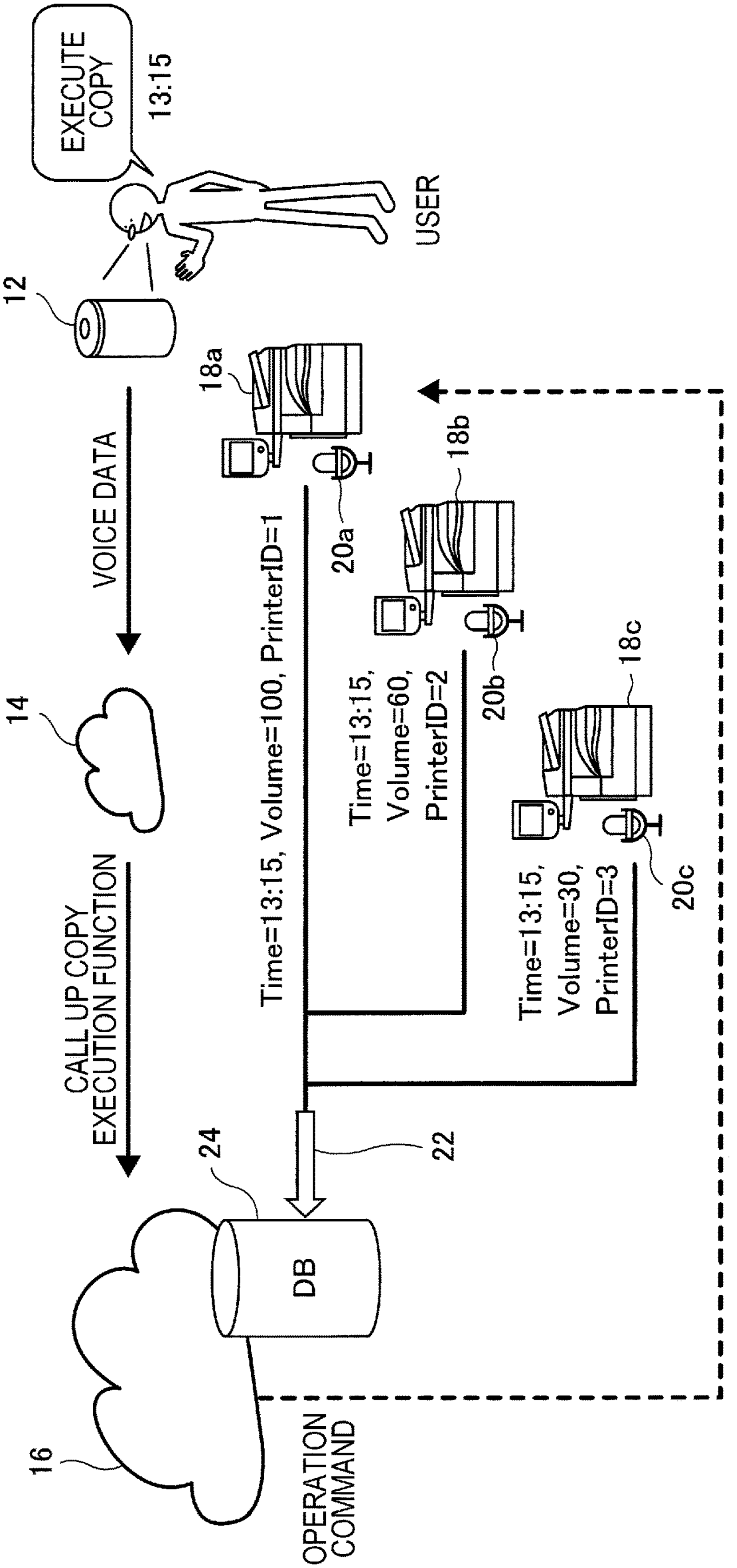
FIG. 1 illustrates an overall control system according to an exemplary embodiment of the present disclosure.

FIG. 1 illustrates an overall control system 10 according to the exemplary embodiment of the present disclosure.

The control system 10 has a voice receiving device 12 that receives voice uttered by a user. The voice receiving device 12 is, for example, a smart speaker and is connected to an external server 14 over the Internet.

Note that the smart speaker is a speaker that has an artificial intelligence (AI) assistance function.

The external server 14 recognizes received voice by using AI. The external server 14 is provided with an application programming interface (API, which is an interface used for communication between software components) that can be self-developed. The external server 14 generates an operation instruction to operate an apparatus from voice received from the voice receiving device 12 through this API. For example, in a case where a user utters "execute copy", the external server 14 transmits an operation instruction to call up a copy execution function to a control server 16 that will be described later.

For example, three image forming apparatuses 18*a*, 18*b*, and 18*c* are multi-function printers having functions such as a print function, a facsimile function, a copy function, and a scan function. The image forming apparatus 18*a* is disposed closest to the user, the image forming apparatus 18*c* is disposed farthest from the user, and the image forming apparatus 18*b* is disposed between the image forming apparatus 18*a* and the image forming apparatus 18*c*. Voice input units (microphones) 20*a*, 20*b*, and 20*c* are provided corresponding to the image forming apparatuses 18*a*, 18*b*, and 18*c*, respectively. When the user utters voice, a sound volume of the voice received by a voice input unit closer to the user among the voice input units 20*a*, 20*b*, and 20*c* is larger. For example, a sound volume of the voice received by the voice input unit 20*a* is 65 decibels, a sound volume of the voice received by the voice input unit 20*b* is 40 decibels, and a sound volume of the voice received by the voice input unit 20*c* is 30 decibels.

The voice input units 20*a*, 20*b*, and 20*c* need not detect sound volumes of voice as absolute values and may detect sound volumes of voice as relative values.

The image forming apparatuses 18*a*, 18*b*, and 18*c* are connected to the control server 16 over a network 22. The network 22 may be a local network or may be the Internet.

Upon receipt of user's voice from the voice input units 20*a*, 20*b*, and 20*c*, the image forming apparatuses 18*a*, 18*b*, and 18*c* transmit, to the control server 16, a sound volume of the received voice, a current time, and an ID (which is an example of identification information and is data, such as a MAC address and a name, uniquely specifying an image forming apparatus). Hereinafter, the sound volume of the received voice, current time, and ID are collectively referred to as "utterance information".

In the present exemplary embodiment, a sound volume of voice is transmitted from the voice input units 20*a*, 20*b*, and 20*c* to the control server 16 through the image forming apparatuses 18*a*, 18*b*, and 18*c*, but a sound volume of voice may be directly transmitted from the voice input units 20*a*, 20*b*, and 20*c* to the control server 16. The voice input units 20*a*, 20*b*, and 20*c* need just be disposed corresponding to the image forming apparatuses 18*a*, 18*b*, and 18*c*, respectively and may be provided away from the corresponding image forming apparatuses. Furthermore, the voice input units 20*a*, 20*b*, and 20*c* may transmit voice directly to the control server 16 without extracting a sound volume of the voice, and the control server 16 may extract the sound volume of the voice.

The control server 16 serves as a control device for controlling the image forming apparatuses 18*a*, 18*b*, and 18*c* that are target apparatuses. An utterance information database 24 that manages utterance information is connected to the control server 16. In the present exemplary embodiment, the control server 16 compares a time of call-up of the external server 14 and a time of receipt of utterance information from the image forming apparatuses 18*a*, 18*b*, and 18*c* and transmits an operation command to the image forming apparatus 18*a* that received the voice in the largest sound volume at the time, i.e., is closest to the user. The operation command is a command from the control server 16 for causing the image forming apparatus 18*a* to execute an operation based on the operation instruction.

Figure 2:
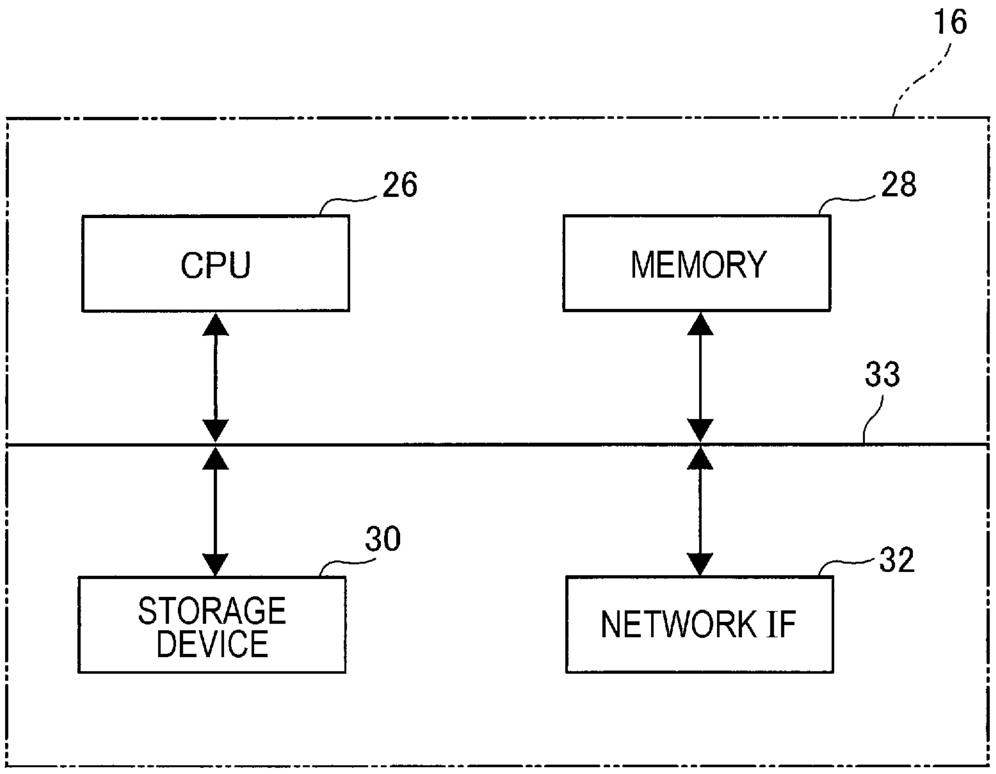
FIG. 2 is a block diagram illustrating hardware of a control device according to the exemplary embodiment of the present disclosure.

As illustrated in FIG. 2, the control server 16 has a CPU 26, a memory 28, a storage device 30, and a network interface 32, which are connected to one another through a bus 33.

The CPU 26 executes predetermined processing on the basis of a control program stored in the memory 28. The storage device 30 is, for example, constituted by a hard disk and stores therein necessary software and data. The network interface 32 is for input and output of data through the network 22.

Figure 3:
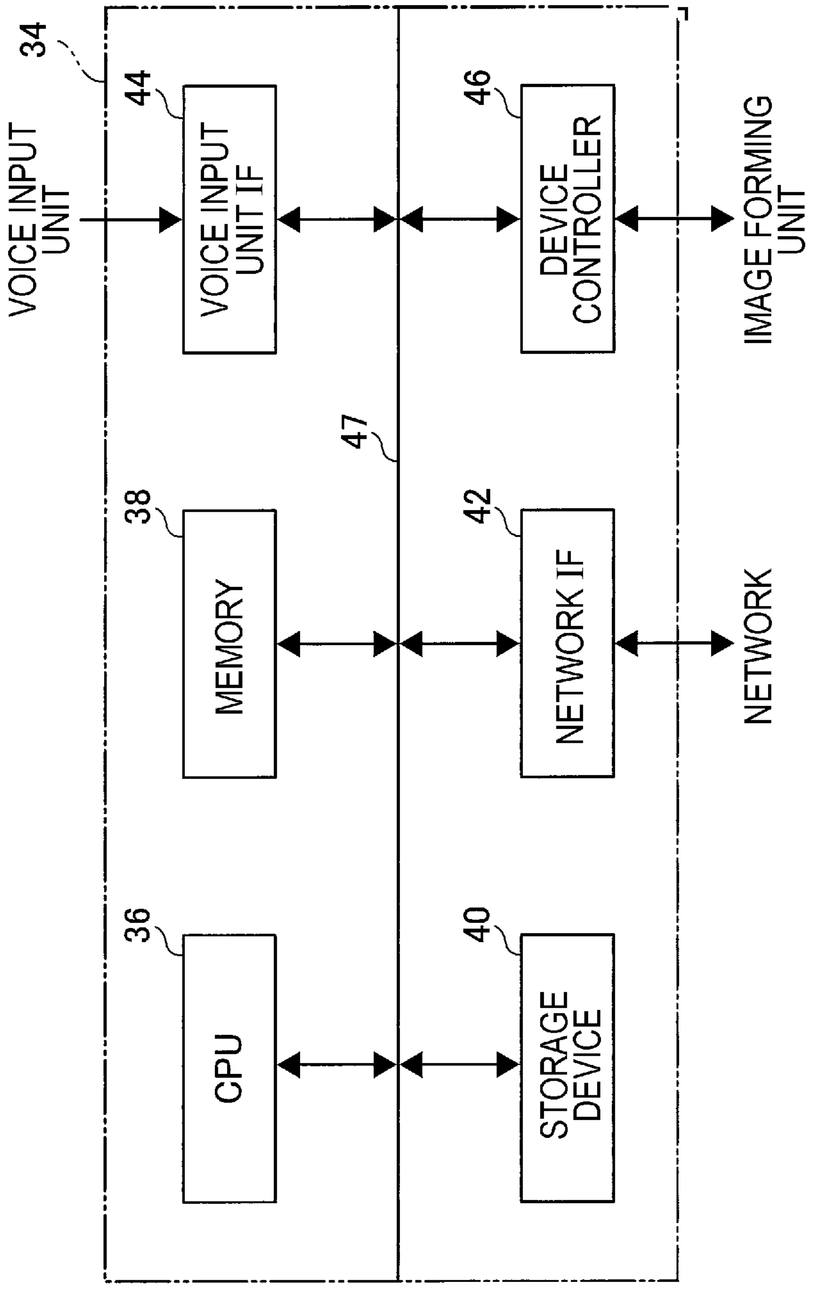
FIG. 3 is a block diagram illustrating hardware of a controller of an image forming apparatus used in the exemplary embodiment of the present disclosure.

As illustrated in FIG. 3, the image forming apparatuses 18*a*, 18*b*, and 18*c* each have a controller body 34 that is constituted by a computer as with the control server 16.

That is, the controller body 34 has a CPU 36, a memory 38, a storage device 40, a network interface 42, a voice input unit interface 44, and a device controller 46, which are connected to one another through a bus 47.

The CPU 36 executes predetermined processing on the basis of a control program stored in the memory 38. The storage device 40 is, for example, constituted by a hard disk and stores therein necessary software and data. The network interface 42 is for input and output of data through the network 22. The voice input unit interface 44 is for input and output of voice from and to the voice input units 20*a*, 20*b*, and 20*c*. The device controller 46 execute processing such as print, facsimile transmission reception, copy, and scan by controlling devices in the image forming apparatuses 18*a*, 18*b*, and 18*c*.

Figure 4:
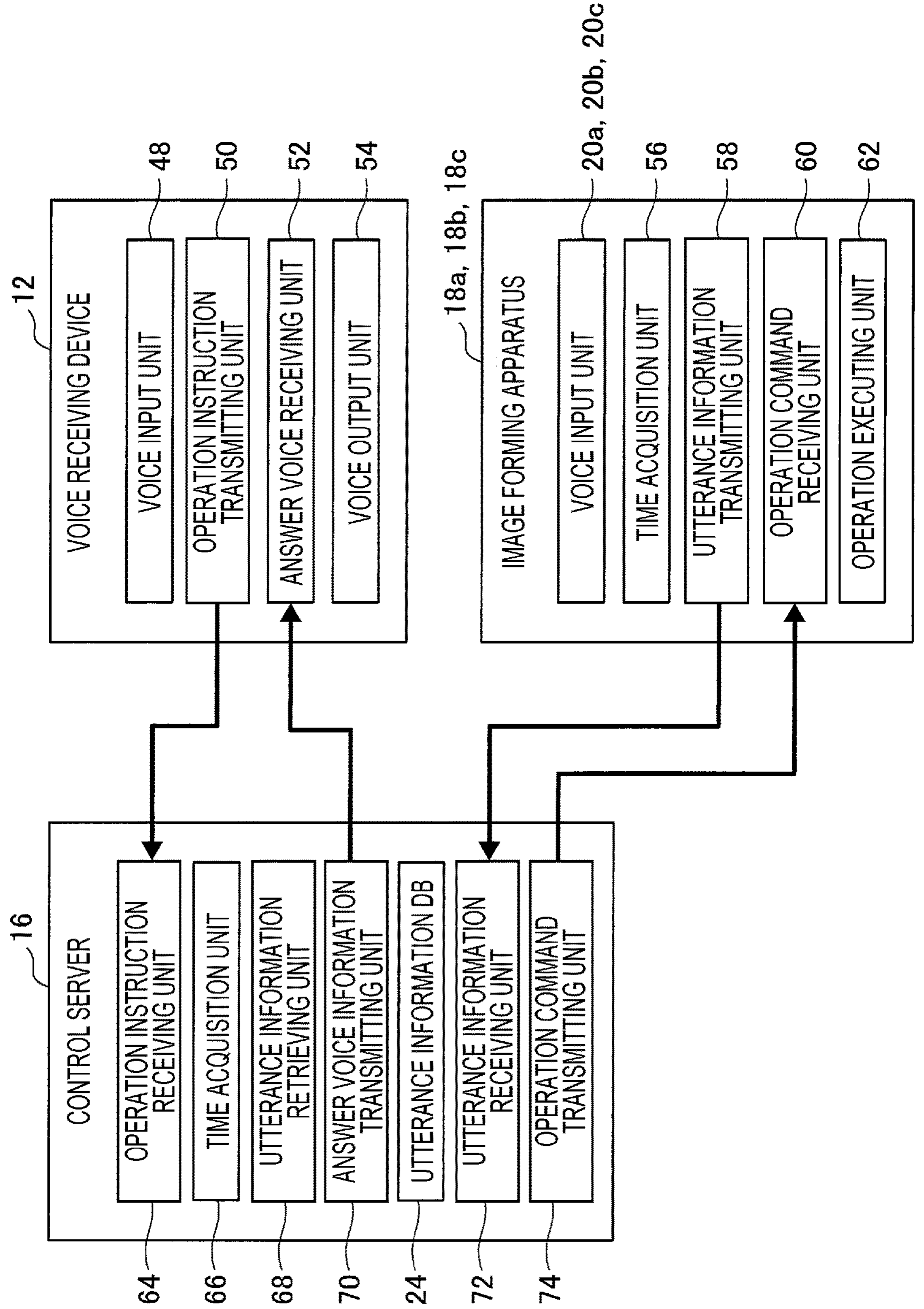
FIG. 4 is a block diagram illustrating functions of a control system according to the exemplary embodiment of the present disclosure.

FIG. 4 is a block diagram illustrating functions of the control system 10.

In FIG. 4, the external server 14 is omitted.

The voice receiving device 12 has a voice input unit 48, an operation instruction transmitting unit 50, an answer voice receiving unit 52, and a voice output unit 54. The voice input unit 48 receives voice uttered by a user. The operation instruction transmitting unit 50 transmits an operation instruction to the control server 16 upon receipt of voice. The answer voice receiving unit 52 receives answer voice information corresponding to the operation instruction. The voice output unit 54 outputs, for the user, answer voice received by the answer voice receiving unit 52.

The image forming apparatuses 18*a*, 18*b*, and 18*c* each have a time acquisition unit 56, an utterance information transmitting unit 58, an operation command receiving unit 60, and an operation executing unit 62 in addition to the voice input unit 20*a*, 20*b*, or 20*c*. The time acquisition unit 56 acquires a current time. The utterance information transmitting unit 58 transmits, to the control server 16, a sound volume of voice input from the voice input unit 20*a*, 20*b*, or 20*c*, a time of the voice input, and an ID of the image forming apparatus 18*a*, 18*b*, or 18*c*. The operation command receiving unit 60 receives an operation command from the control server 16. The image forming apparatuses 18*a*, 18*b*, and 18*c* regularly check whether there is an operation command in the control server 16, and in a case where there is an operation command in the control server 16, the operation command is transmitted from the control server 16.

The control server 16 has an operation instruction receiving unit 64, a time acquisition unit 66, an utterance information retrieving unit 68, an answer voice information transmitting unit 70, an utterance information receiving unit 72, and an operation command transmitting unit 74 in addition to the utterance information database 24. The operation instruction receiving unit 64 receives an operation instruction from the voice receiving device 12. The time acquisition unit 66 acquires a current time.

The utterance information retrieving unit 68 searches the utterance information database 24 and retrieves utterance information (a time, a sound volume, and an ID) of the same time as a time of user's utterance toward the voice receiving device 12 by comparison with a time acquired by the time acquisition unit 66. Note that the same time is a time within a predetermined range. The utterance information retrieving unit 68 returns utterance information including a maximum sound volume among retrieved pieces of utterance information as a retrieval result.

The answer voice information transmitting unit 70 transmits an answer corresponding to the operation instruction to the voice receiving device 12. The utterance information receiving unit 72 receives utterance information (a time, a sound volume, and an ID) transmitted from the image forming apparatuses 18*a*, 18*b*, and 18*c*. The operation command transmitting unit 74 transmits an operation command for execution in the image forming apparatuses 18*a*, 18*b*, and 18*c* to the image forming apparatuses 18*a*, 18*b*, and 18*c*.

Next, an operation flow for automatically determining a target apparatus in the image forming apparatuses 18*a*, 18*b*, and 18*c* is described.

Figure 5:
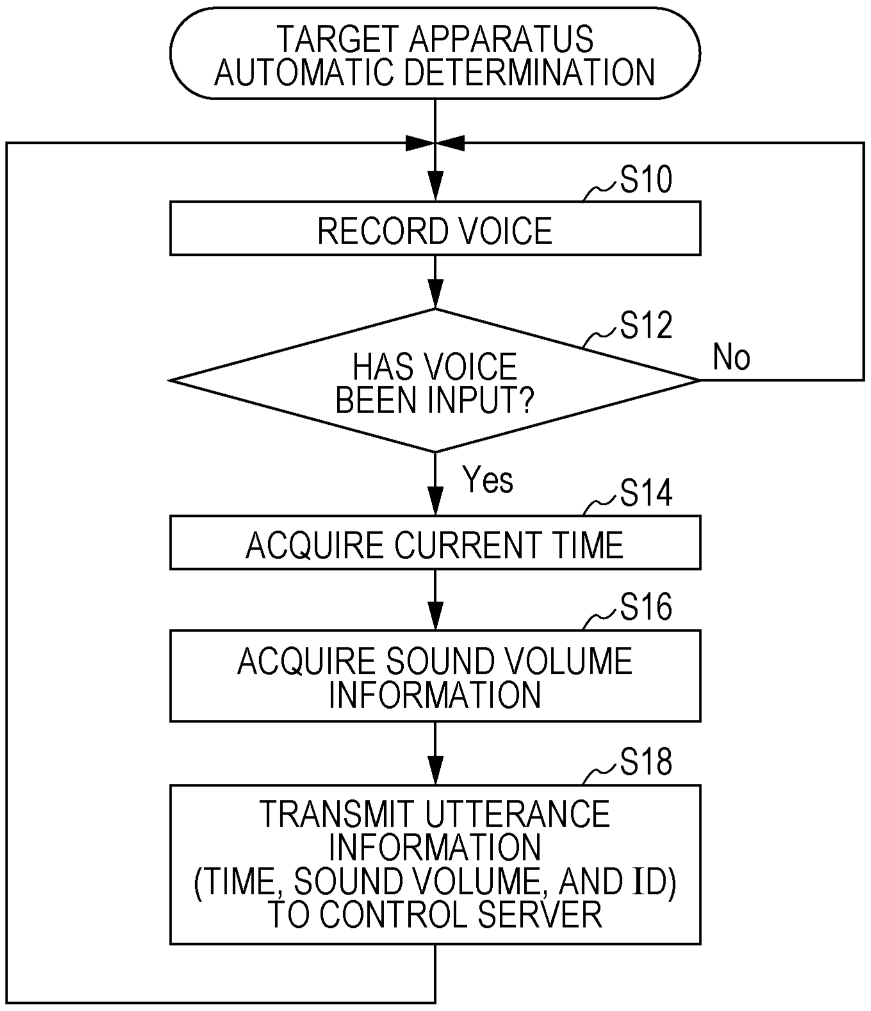
FIG. 5 is a flowchart illustrating an operation flow for automatically determining an operation target apparatus in an image forming apparatus used in the exemplary embodiment of the present disclosure.

As illustrated in FIG. 5, first, in step S10, the image forming apparatuses 18*a*, 18*b*, and 18*c* shift to a state where voice is always recorded. Next, in step S12, it is determined whether or not there is input voice. In a case where it is determined in step S12 that there is no input voice, step S10 is performed again, and the image forming apparatuses 18*a*, 18*b*, and 18*c* wait until voice is input. In a case where it is determined in step S12 that there is input voice, step S14 is performed in which a current time is acquired. Next, in step S16, information concerning a sound volume is acquired from the voice recorded in step S10. The information concerning a sound volume may be a sound volume itself or may be a relative value. In a case where information concerning a sound volume is acquired in step S16, next step S18 is performed in which utterance information (a time, a sound volume, and an ID) is transmitted to the control server 16. Then, step S10 is performed again, and the above operation is repeated. This utterance information is stored in the utterance information database 24 of the control server 16.

Next, an operation flow of the control server 16 is described.

Figure 6:
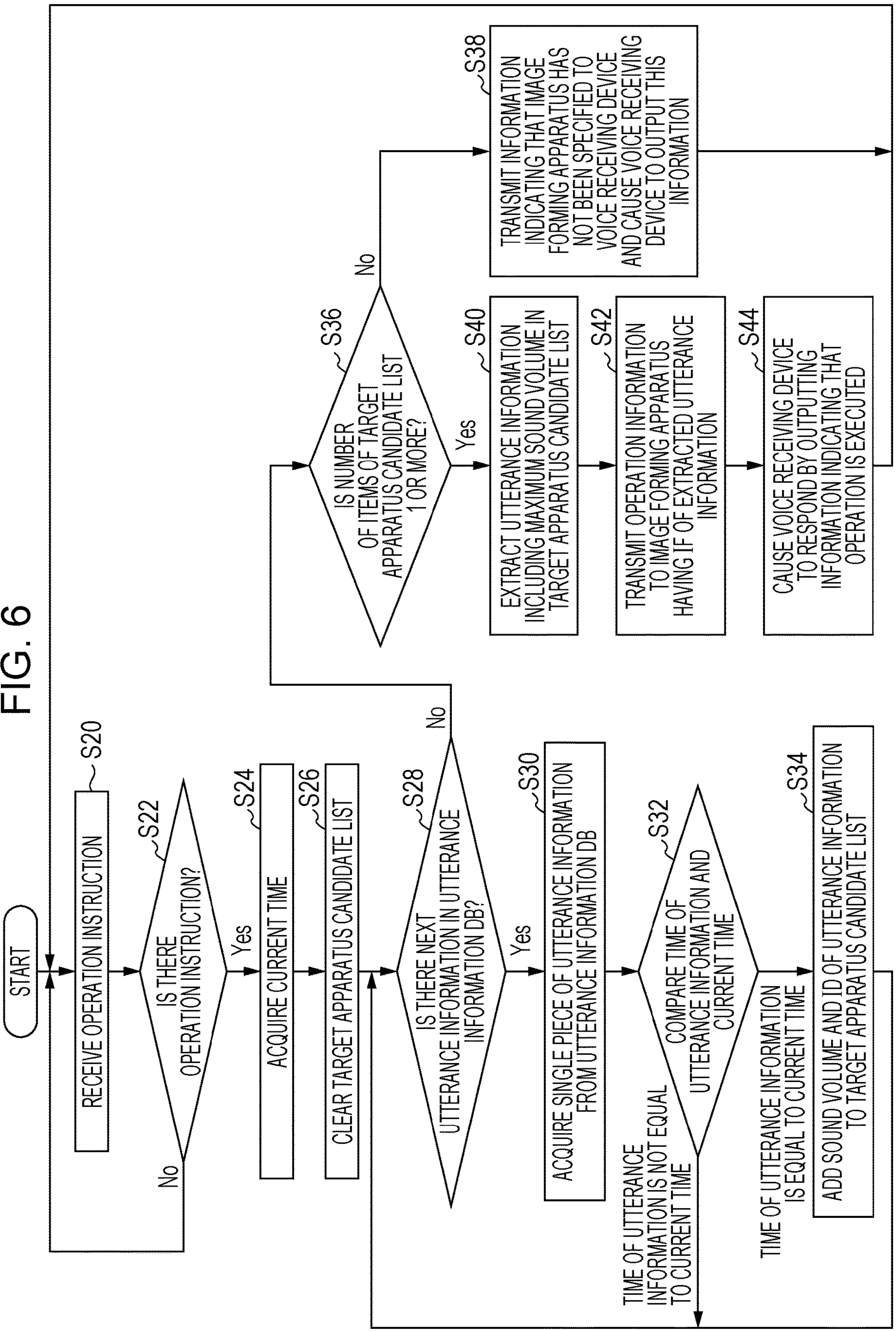
FIG. 6 is a flowchart illustrating an operation flow of the control device according to the exemplary embodiment of the present disclosure.

As illustrated in FIG. 6, first, in step S20, the control server 16 shifts to a state where an operation instruction from the voice receiving device 12 can be received. Next, in step S22, it is determined whether or not there is an operation instruction from the voice receiving device 12. In a case where it is determined that there is no operation instruction, step S20 is performed again in which the control server 16 waits until an operation instruction is received. In a case where it is determined in step S22 that there is an operation instruction, step S24 is performed.

In step S24, a current time is acquired. Next, in step S26, a previous target apparatus candidate list that is stored is cleared. Next, in step S28, it is determined whether or not there is next utterance information in the utterance information database 24.

In a case where it is determined in step S28 that there is next utterance information in the utterance information database 24, step S30 is performed. In step S30, a single piece of utterance information is acquired from the utterance information database 24. Next, in step S32, a time of the utterance information acquired in step S30 and the current time (a time of receipt of the operation instruction from the voice receiving device 12) acquired in step S24 are compared. In a case where it is determined in step S32 that the time of utterance information and the current time are identical, step S34 is performed in which a sound volume and an ID of the utterance information are added to the target apparatus candidate list. The expression "the time of utterance information and the current time are identical" means that the time of the utterance information and the current time are within a predetermined period. In a case where it is determined in step S32 that the time of the utterance information and the current time are not identical and in a case where the process in step S34 is finished, step S28 is performed again in which it is determined whether or not there is next utterance information in the utterance information database 24.

Meanwhile, in a case where it is determined in step S28 that there is no next utterance information in the utterance information database 24, step S36 is performed in which it is determined whether or not the number of items of the target apparatus candidate list is 1 or more. In a case where it is determined in step S36 that the number of items of the target apparatus candidate list is not 1 or more (there is no target apparatus candidate in the target apparatus candidate list), step S38 is performed in which information indicating that an image forming apparatus has not been specified is transmitted to the voice receiving device 12. Upon receipt of this information, the voice receiving device 12 outputs the information indicating that an image forming apparatus has not been specified as voice by using the voice output unit 54.

Although it is determined in step S36 that there is no target apparatus candidate in a case where utterance information has not been acquired from the voice input units 20*a*, 20*b*, and 20*c* of the image forming apparatuses 18*a*, 18*b*, and 18*c*, it may be determined that there is no target apparatus candidate also in a case where utterance information has been acquired from the voice input units 20*a*, 20*b*, and 20*c* but a sound volume is smaller than a predetermined value.

In a case where it is determined in step S36 that the number of items of the target apparatus candidate list is 1 or more, step S40 is performed. In step S40, utterance information including a maximum sound volume in the target apparatus candidate list is extracted. Next, in step S42, an operation command is transmitted to an image forming apparatus having the utterance information including the maximum sound volume extracted in step S40. Then, in step S44, the voice receiving device 12 is given a command to respond by outputting information indicating that the operation is executed. In response to this command, the voice receiving device 12 outputs, as voice, information indicating that the operation command has been transmitted to an image forming apparatus closest to the user. When the process in step 38 or step S44 is finished, step S20 is performed again in which the control server 16 waits until an operation instruction is received.

An operation command is transmitted to an image forming apparatus that has transmitted utterance information including a maximum sound volume in step S40, but in a case where voice uttered by a user includes a word uniquely specifying an image forming apparatus, for example, in a case where voice uttered by a user includes a name or the like given to an image forming apparatus, an operation command may be transmitted to an image forming apparatus corresponding to the name.

In a case where voice uttered by a user includes not a word uniquely specifying an image forming apparatus but a specific word concerning a distance, for example, in a case where voice uttered by a user includes a word concerning a short distance such as "this" or "here", an operation command is transmitted to an image forming apparatus that has received voice at a maximum sound volume, in a case where voice uttered by a user includes a word concerning a long distance such as "that" or "there", an operation command is transmitted to an image forming apparatus that has received voice at a minimum sound volume, and in a case where voice uttered by a user includes a word concerning a middle distance, an operation command is transmitted to an image forming apparatus that has received voice at a middle sound volume.

Note that the word concerning a middle distance is a demonstrative indicative of an object or a place whose distance from a user is between a distance indicated by the word concerning a short distance and a distance indicated by the word concerning a long distance.

Alternatively, in a case where a specific word concerning a distance is uttered, an operation command may be transmitted to an image forming apparatus that has received voice at a sound volume in a predetermined range. For example, in a case where voice uttered by a user includes a word concerning a short distance, an operation command is transmitted to an image forming apparatus that has received voice at 60 decibels or more, in a case where voice uttered by a user includes a word concerning a middle distance, an operation command is transmitted to an image forming apparatus that has received voice at not less than 40 decibels and not more than 60 decibels, and in a case where voice uttered by a user includes a word concerning a long distance, an operation command is transmitted to an image forming apparatus that has received voice at less than 40 decibels.

In a case where voice uttered by a user includes a specific word indicative of any one, for example, a word such as "any" or "whichever", an operation command may be transmitted to an image forming apparatus that has transmitted utterance information including a maximum sound volume. In this case, it is possible to employ an arrangement in which a target apparatus is not specified in a case where voice uttered by a user does not include a specific word.

In step S44, information indicating that an operation command has been transmitted to an image forming apparatus is output by the voice receiving device 12 as voice, but a name and an ID of the image forming apparatus to which the operation command has been transmitted may be further output as voice.

Although an operation instruction is transmitted to a control server through an external server in the above exemplary embodiment, an operation instruction may be transmitted directly from a voice receiving device to a control server.

Although a target apparatus is an image forming apparatus in the above exemplary embodiment, examples of the target apparatus include electronics products, automobiles, and the like.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A control device comprising:

a processor programmed to act as:

a first receiving unit that receives an operation instruction given by voice or generated from voice;

a second receiving unit that receives information concerning a sound volume of a voice input to a voice input unit provided corresponding to a target apparatus;

a target apparatus specifying unit that specifies a target apparatus on a basis of the information concerning the sound volume received by the second receiving unit; and a transmitting unit that transmits an operation command based on the operation instruction received by the first receiving unit to the target apparatus specified by the target apparatus specifying unit, wherein the target apparatus specifying unit specifies a target apparatus for which a sound volume of the voice input to the voice input unit is largest.

2. The control device according to claim 1, wherein the target apparatus specifying unit specifies a target apparatus for which a sound volume of the voice input to the voice input unit is largest in a case where the second receiving unit receives information concerning a sound volume of the voice from voice input units of a plurality of target apparatuses within a predetermined period.

3. The control device according to claim 1, wherein in a case where the operation instruction received by the first receiving unit includes a specific word, the target apparatus specifying unit specifies a target apparatus for which a sound volume of the voice input to the voice input unit is largest.

4. The control device according to claim 1, wherein in a case where the operation instruction received by the first receiving unit does not include designation of a target apparatus, the target apparatus specifying unit specifies a target apparatus for which a sound volume of the voice input to the voice input unit is largest.

5. The control device according to claim 1, wherein the operation instruction received by the first receiving unit includes a specific word concerning a distance, and the target apparatus specifying unit specifies a target apparatus on a basis of the specific word concerning a distance and the information concerning the sound volume received by the second receiving unit.

6. The control device according to claim 5, wherein in a case where the second receiving unit receives information concerning a sound volume of the voice from respective voice input units of a plurality of target apparatuses, and the specific word concerning a distance is a word concerning a short distance, the target apparatus specifying unit specifies a target apparatus for which the sound volume of the voice received by the second receiving unit is larger than other target apparatuses.

7. The control device according to claim 5, wherein in a case where the second receiving unit receives information concerning a sound volume of the voice from respective voice input units of a plurality of target apparatuses, and the specific word concerning a distance is a word concerning a long distance, the target apparatus specifying unit specifies a target apparatus for which the sound volume of the voice received by the second receiving unit is smaller than other target apparatuses.

8. The control device according to claim 6, wherein
in a case where the second receiving unit receives information concerning a sound volume of the voice from respective voice input units of a plurality of target apparatuses, and the specific word concerning a distance is a word concerning a long distance, the target apparatus specifying unit specifies a target apparatus for which the sound volume of the voice received by the second receiving unit is smaller than other target apparatuses.

9. The control device according to claim 1, wherein
the target apparatus specifying unit does not specify any target apparatuses in a case where sound volumes of the voice received by the second receiving unit that correspond to all target apparatuses are smaller than a predetermined value.

10. The control device according to claim 1, wherein
the target apparatus specifying unit specifies a target apparatus in a case where the information concerning a sound volume of the voice input to the voice input unit is acquired within a predetermined period from a time of receipt of the operation instruction by the first receiving unit.

11. The control device according to claim 1, wherein
the target apparatus specifying unit does not specify any target apparatuses in a case where the information concerning a sound volume of the voice input to the voice input unit is not acquired within a predetermined period from a time of receipt of the operation instruction by the first receiving unit.

12. A control system comprising:
a voice receiving device that receives voice; and
a control device that controls a target apparatus on a basis of information concerning a sound volume of the voice received by the voice receiving device,
wherein the control device includes:
a first receiving unit that receives an operation instruction given by the voice or generated from voice from the voice receiving device;
a second receiving unit that receives information concerning a sound volume of a voice input to a voice input unit provided corresponding to a target apparatus;
a target apparatus specifying unit that specifies a target apparatus on a basis of the information concerning the sound volume received by the second receiving unit; and
a transmitting unit that transmits an operation command based on the operation instruction received by the first receiving unit to the target apparatus specified by the target apparatus specifying unit, wherein
the target apparatus specifying unit specifies a target apparatus for which a sound volume of the voice input to the voice input unit is largest.

13. The control system according to claim 12, wherein
the voice receiving device further includes a voice output unit that outputs voice; and
the voice output unit outputs, as voice, identification information for identifying the target apparatus to which the operation command is transmitted.

14. A non-transitory computer readable medium storing a program causing a computer to execute a process, the process comprising:
receiving an operation instruction given by voice or generated from voice;
receiving information concerning a sound volume of a voice input to a voice input unit provided corresponding to a target apparatus;
specifying a target apparatus on a basis of the received information concerning the sound volume; and
transmitting an operation command based on the received operation instruction to the specified target apparatus, wherein
the specifying the target apparatus is specifying a target apparatus for which a sound volume of the voice input to the voice input unit is largest.

* * * * *